(12) United States Patent
Conrardy et al.

(10) Patent No.: US 8,100,271 B2
(45) Date of Patent: Jan. 24, 2012

(54) TIERED BATTERY CABINET

(75) Inventors: William Conrardy, Elmhurst, IL (US); Michael Osko, Elgin, IL (US); Christopher Heinz, McHenry, IL (US)

(73) Assignee: C & C Power, Elmhurst, IL (US)

( * ) Notice: Subject to any disclaimer, the term of this patent is extended or adjusted under 35 U.S.C. 154(b) by 1461 days.

(21) Appl. No.: 11/346,042

(22) Filed: Feb. 2, 2006

(65) Prior Publication Data
US 2007/0178369 A1   Aug. 2, 2007

(51) Int. Cl.
*A47G 19/08* (2006.01)
(52) U.S. Cl. .................................................. 211/49.1
(58) Field of Classification Search ............... 211/49.1, 211/26, 189, 182, 134, 187, 191, 190, 192, 211/207, 13.1, 183; 429/96, 99, 66, 130, 429/152, 153, 158, 100, 175, 160; 312/257.1, 312/265.4, 330.1, 257, 1; 108/193
See application file for complete search history.

(56) References Cited

U.S. PATENT DOCUMENTS

| | | | |
|---|---|---|---|
| 2,577,101 A * | 12/1951 | Ball et al. ..................... | 312/107 |
| 2,959,715 A | 11/1960 | Leonchick | |
| D191,249 S * | 8/1961 | Gardner et al. ............... | D6/474 |
| 3,102,640 A * | 9/1963 | Keller ........................ | 211/128.1 |
| 4,073,556 A | 2/1978 | Wilson, Jr. | |
| 4,270,661 A * | 6/1981 | Rosenband ................... | 211/59.2 |
| 4,383,614 A | 5/1983 | Miller | |
| 4,754,369 A | 6/1988 | Nilsson | |
| 4,785,943 A * | 11/1988 | Deffner et al. ............... | 211/59.2 |
| 4,801,023 A * | 1/1989 | Ecclestone ..................... | 211/55 |
| 4,925,038 A * | 5/1990 | Gajewski ..................... | 211/59.2 |
| 4,957,829 A | 9/1990 | Holl | |
| 5,212,024 A | 5/1993 | Klink et al. | |
| 5,284,254 A * | 2/1994 | Rinderer ........................ | 211/26 |
| 5,295,591 A | 3/1994 | Slater | |
| 5,372,262 A | 12/1994 | Benson et al. | |
| 5,378,057 A | 1/1995 | Bach et al. | |
| 5,403,679 A | 4/1995 | Stone | |
| 5,589,290 A | 12/1996 | Klink et al. | |
| 5,593,048 A | 1/1997 | Johnson | |

(Continued)

FOREIGN PATENT DOCUMENTS
DE   87 02 779.8   9/1987
(Continued)

OTHER PUBLICATIONS
International Search Report from PCT International Application No. PCT/US2007/001093 dated Sep. 18, 2007 (4 pages).
(Continued)

*Primary Examiner* — Sarah Purol
(74) *Attorney, Agent, or Firm* — Brinks Hofer Gilson & Lione

(57) ABSTRACT

An apparatus and method of mounting storage batteries are presented in which batteries in multiple tiers may be easily accessed for installation and servicing. A battery cabinet or relay rack has provision for multiple tiers of batteries spaced so that batteries may be inserted in each tier. The batteries are supported by a tray or other structure so that they are positioned to permit top access to the battery terminals mounted on the front or front to surfaces of the battery. Tiers are positioned further from the front of the relay rack as the height of the tier increases.

36 Claims, 7 Drawing Sheets

U.S. PATENT DOCUMENTS

| | | | |
|---|---|---|---|
| 5,867,372 A * | 2/1999 | Shie | 361/826 |
| 5,890,606 A | 4/1999 | Kuipers | |
| 5,979,672 A | 11/1999 | Gemra et al. | |
| 5,996,822 A * | 12/1999 | Hopkins | 211/134 |
| 6,003,692 A * | 12/1999 | Kozak | 211/74 |
| 6,006,925 A | 12/1999 | Sevier | |
| 6,053,114 A * | 4/2000 | Villanueva | 108/96 |
| 6,202,860 B1 | 3/2001 | Ludwig | |
| 6,310,783 B1 * | 10/2001 | Winch et al. | 361/797 |
| 6,451,475 B1 | 9/2002 | Sherwood | |
| 6,475,659 B1 * | 11/2002 | Heimer | 429/66 |
| 6,481,582 B1 | 11/2002 | Rinderer | |
| 6,482,541 B1 | 11/2002 | Bator, Jr. et al. | |
| 6,598,270 B2 | 7/2003 | Larsen et al. | |
| 6,605,777 B1 | 8/2003 | Anderson et al. | |
| 6,638,660 B2 | 10/2003 | Stone et al. | |
| 6,643,122 B1 | 11/2003 | Fontana et al. | |
| 6,644,481 B2 | 11/2003 | Dean et al. | |
| 6,719,150 B2 | 4/2004 | Marraffa | |
| 6,901,946 B2 | 6/2005 | Frazier | |
| 6,951,288 B2 | 10/2005 | Henderson | |
| 2002/0117942 A1 | 8/2002 | Audibert et al. | |
| 2002/0153814 A1 | 10/2002 | Robideau | |
| 2002/0192543 A1 | 12/2002 | Heimer | |
| 2003/0003350 A1 | 1/2003 | Heimer et al. | |
| 2004/0079714 A1 | 4/2004 | Andrew et al. | |
| 2007/0178369 A1 * | 8/2007 | Conrardy et al. | 429/100 |
| 2007/0278915 A1 * | 12/2007 | Conrardy et al. | 312/257.1 |

FOREIGN PATENT DOCUMENTS

| | | |
|---|---|---|
| EP | 0 281 710 A1 | 9/1988 |
| FR | 874.287 | 8/1942 |
| JP | 59-160954 | 9/1984 |
| JP | 60-236454 | 11/1985 |
| JP | 2000-48788 | 7/1998 |
| JP | 2000048788 | 2/2000 |

OTHER PUBLICATIONS

May 21, 2010 Non-Final Office Action, U.S. Appl. No. 11/799,626 (18 pages).
Response to May 21, 2010 Non-Final Office Action, U.S. Appl. No. 11/799,626, filed in the PTO on Jun. 30, 2010 (13 pages).
Jul. 27, 2010 Final Office Action, U.S. Appl. No. 11/799,626 (19 pages).
Response to Jul. 27 2010 Final Office Action, U.S. Appl. No. 11/799,626, filed in the PTO on Aug. 24, 2010 (12 pages).
Jan. 24, 2011 Non-Final Office Action, U.S. Appl. No. 11/799,626 (19 pages).
Response to Jan. 24, 2011 Non-Final Office Action, U.S. Appl. No. 11/799,626, filed in the PTO on Apr. 15, 2011 (12 pages).
Non-Final Office Action for related U.S. Appl. No. 11/799,626, mailing date May 31, 2011.
Response to Office Action mailed May 31, 2011, in related U.S. Appl. No. 11/799,626, filed Oct. 28, 2011.

* cited by examiner

TIERED BATTERY CABINET

TECHNICAL FIELD

The present application may relate to an apparatus for retaining storage batteries, and more specifically to an apparatus which may permit convenient access to the battery terminals.

BACKGROUND

Battery cabinets or battery racks are used to house groups of storage batteries and ancillary equipment and may be a component of battery backup systems as used in telephone, computer and other systems requiring auxiliary or uninterrupted power. The batteries may be required to supply high currents. As the batteries have a finite lifetime, and the connections to the batteries require servicing, such as verifying or resetting the torque of the connection, easy access to the battery terminals and to the batteries for servicing and replacement is desired.

Where the batteries are arranged so as to be disposed in rows situated directly above each other, the structure of an upper battery interferes with access to a lower battery, particularly with respect to the battery terminals, which are difficult to access if they are disposed on the top surface of the battery. A large vertical space may have to be provided between adjacent tiers of batteries to permit clearance for servicing tools such as wrenches and the like. Such an arrangement increases the height of a battery cabinet or rack and has undesirable economic and ergonomic consequences. Alternatively, the terminals of the batteries may be disposed on a front surface of the battery. Even with such a construction, the placement of the batteries in vertically oriented tiers directly above one another limits access for tools, requiring extension parts for the tools or specialized fasteners.

In another configuration, the battery connection terminals may be at the top of the battery, but extended to the front face of the battery by "L"-shaped brackets. In this circumstance, one end of the "L"-shaped bracket is bolted to the battery terminal on top of the battery, and the battery cable is bolted to other end of the bracket at the front face of the battery; such construction increases the number of joints or connections, increasing the circuit resistance and involving more maintenance and reduced reliability.

The servicing of batteries by replacement, and the maintenance of the installation, involving inspecting, torquing or otherwise tightening the cable connections to the batteries would be facilitated if convenient top access to a portion of the battery at one end thereof, where the battery terminals are located was provided.

SUMMARY

An apparatus is disclosed where a battery cabinet or battery rack is provided. Generally, the terms battery rack and battery cabinet are used interchangeably herein. The battery cabinet is capable of accepting a plurality of batteries which may be positioned on a plurality of supports in a tiered arrangement such that a front surface of the batteries in each tier of batteries is set back further from the front of the cabinet as the tier rank as measured from the base of the cabinet, increases. The set back between successive tiers is dimensioned such that access to battery terminals on successive tiers is facilitated. In this manner, the battery terminals on the each battery may be accessed from either the top or the front thereof for servicing of the connections and replacement of the batteries. Individual batteries may be connected and disconnected from system cables and busses, and individual batteries may be removed or inserted in predetermined positions in the battery cabinet. Batteries of simple form factor, where the terminals need not be recessed from the battery top surface are also usable. Batteries with the terminals on the front thereof may also be used in this arrangement.

DETAILED DESCRIPTION

Exemplary embodiments may be better understood with reference to the drawings, but these examples are not intended to be of a limiting nature. Like numbered elements in the same or different drawings perform equivalent functions.

Figure 1:
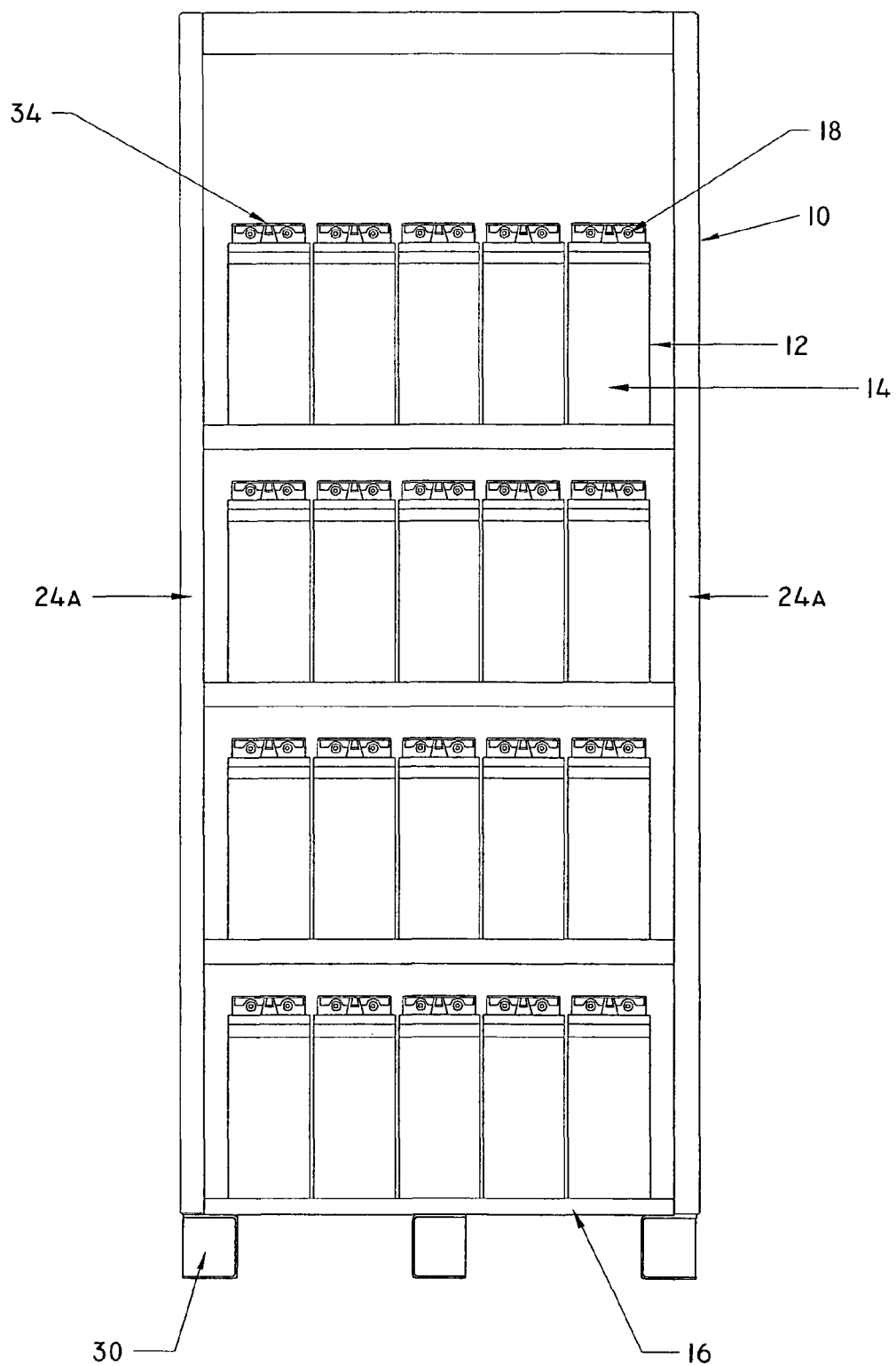
FIG. 1 illustrates a front elevation view of a battery cabinet.

FIG. 1 illustrates a front elevation view of a battery cabinet 10 for mounting a plurality of storage batteries 12 as may be provided in a back-up battery power supply or similar application requiring a plurality of batteries being connected in series, in parallel, or in some combination of connection configurations. The batteries may all be of the same capacity and type, but this is not required. Not all features of a battery cabinet are shown, and a battery cabinet may include doors or removable panels providing access from the front, side, and rear thereof; brackets, bars, lips or tie downs to prevent the batteries from being dislodged during seismic events; circuit breakers, battery chargers, and battery monitors, fuses and other accessories as are known in the art. Such accessories are optional and may be added as desired to meet specific design requirements. The front and rear doors and side panels, connecting cables and ancillary equipment, except for the batteries, are typically not shown in the figures herein in order to avoid excessive detail.

Rack or cabinet mounted electrical or electronic equipment and enclosures or mounting arrangements for such equipment may be designed in accordance with industry standard dimensions and configurations, so as to be more economically produced by multiple manufacturers. Such a standard dimensional measure for the vertical separation of units is a Rack Unit (RU) as standardized by the Electronic Industries Association (EIA), where 1 RU is a distance of 1.75". Mounting hole patterns may also be standardized, such as the EIA 1032 hole pattern. While such standardized dimensions are economically useful, and often used to describe physical objects as, for example, a 19" relay rack, or a device that is 7 RU high, nothing in the use of such terms in the description or figures herein is intended to require or suggest that the dimensions of any aspect of the apparatus conform to any industry standard, nor is compliance to such standards precluded.

Figure 2:
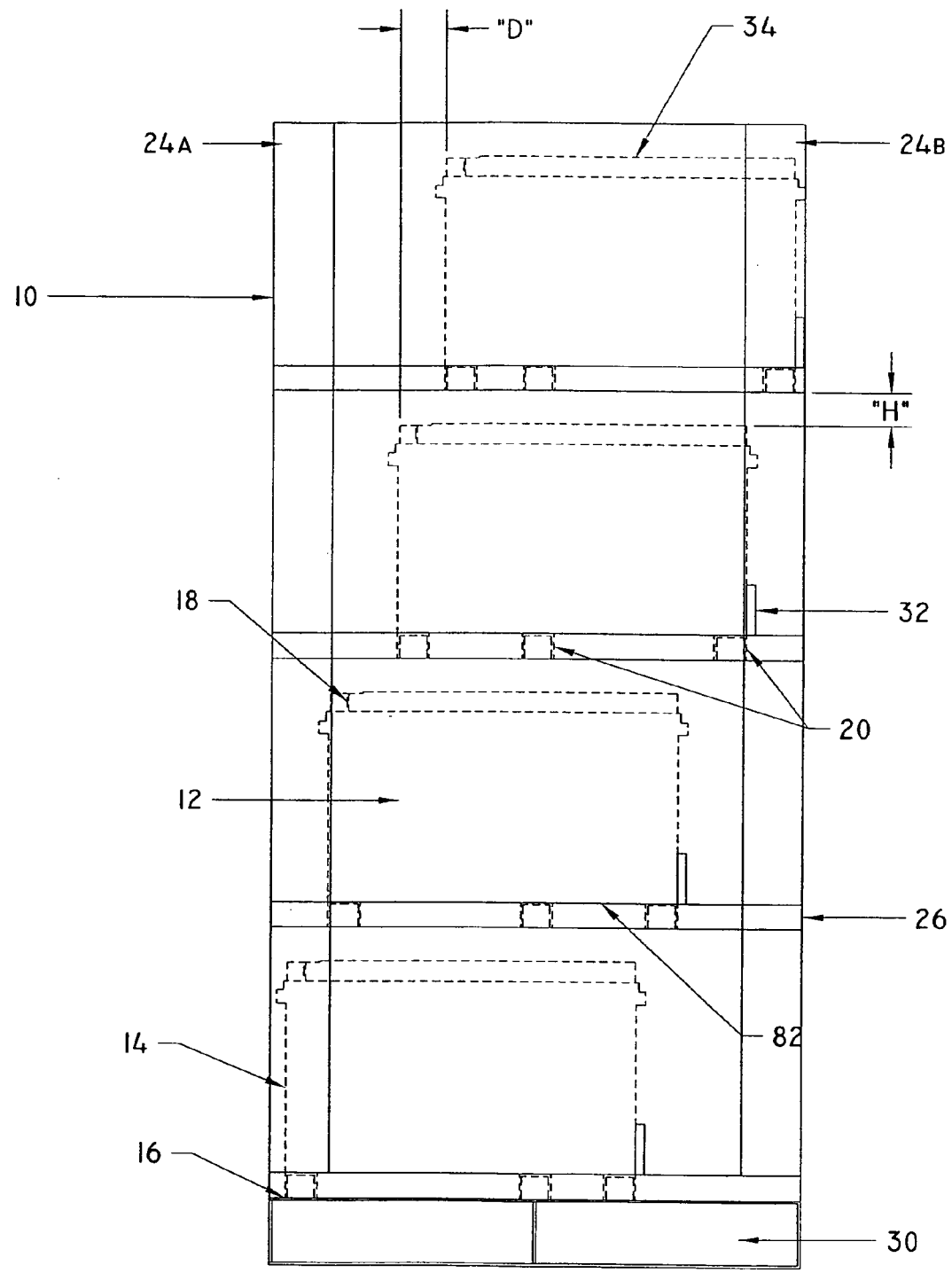
FIG. 2 illustrates a side elevation view of the battery cabinet of FIG. 1.

In a side elevation view of the battery cabinet 10 as illustrated in FIG. 2, the batteries 12 are disposed such that a front surface or end 14 of each battery in successively higher tiers, as measured from the bottom 16 of the battery cabinet 10, is disposed further from the front opening of the battery cabinet 10. The set-back distance D between the front ends 14 of the batteries 12 in successive tiers is sufficient that access from a top direction or a front direction is afforded to the connection terminals 18 on each of the batteries 12 or to a front 14 of a battery 12. The distance D may be chosen depending on the construction of the batteries, the choice of a connector type for the battery interface terminals, and other ergonomic considerations, including the types of servicing tools that are desired to be used.

When compared with a cabinet or rack arrangement where the battery tiers are arranged with each successive tier directly above each other, and having a depth L measured from the front to the back of the battery assembly overall, having N tiers, the overall depth of the enclosure in this example may be increased by approximately $D*(N-1)$.

Each tier of batteries is supported by one or more mechanical supports which may extend between opposite sides of the battery cabinet. Such supports may be transverse elements 20 in the form of "U" channels, "L" channels, box beams or any such structure capable of supporting the battery weight without permanent deflection of the support or damage to the battery, and which meet customer structural requirements or applicable civil or industry codes. A sufficient number of mechanical supports may be provided under each battery 12 so that, as the battery is slid into the tier, there is little or no tendency for the battery lower surface 82 to drop below the plane established by the top surface of the supports 20.

For a battery cabinet or rack, such as in FIGS. 1 and 2, the transverse horizontal supports 20 may be connected to a network of vertical supports 24 near each side of the cabinet, and the vertical supports 24 may be fixedly connected to the base 16 by bolting, welding, or the like. The vertical supports 24 may be disposed at the four corners of the cabinet or rack, or supports, disposed at one or more locations along the side of the cabinet, and intermediate between the front and rear of the cabinet.

The base 16 may be a beam structure, skid structure, or the like, having an outline in plan view substantially corresponding to the plan view dimensions of the cabinet 10. The base may include a plurality of box beams 30 to raise the base 16 off of a supporting floor, and may facilitate the movement of the battery cabinet 10 by a fork lift or the like. Any configuration of base structure may be used which directly or indirectly connects to the vertical supports 24 *a, b*. The vertical supports 24 serve to support the horizontal structures 20, 26 extending therebetween so as to provide one or more planes or tiers for supporting the batteries in a horizontal plane defining a tier.

The battery cabinet 10, whether empty, partially or fully loaded with batteries 12, may be configured such that a center of gravity of the entire assembly, in plan view, is within a perimeter of the base 16. This has the effect of maintaining the stability of the battery cabinet 10, and batteries 12 may be loaded or unloaded from the battery cabinet 10 in any sequence. One means of ensuring that the center of gravity of the battery cabinet 10 or battery rack remains within the plan view periphery of the base 16 is to dimension the base 16 so that the perimeter of the base encloses within the projection of the plan view of the cabinet 10 the outlines of all of the batteries 12 which may be loaded into the cabinet 10 or rack. The perimeter of the base 16 may be rectangular, for example.

The transverse horizontal supports 20 are further supported by longitudinal supports 26 joining front and rear vertical supports 24 *a, b* along each side of the cabinet 10. The connections between the transverse 20, longitudinal 26, and vertical 24 supports may be by a nut and bolt, screws and tapped screw holes, welding, or the like, or a combination thereof, so as to form a fixedly connected truss-like structure of beams and surfaces to support the batteries 12. A retaining plate 32 may be connected between the longitudinal members 26 at each tier to restrain the battery 12 from sliding backwards more than a desired distance in each tier. A similar retaining plate or structure (not shown) may be installed at the front of each battery 12, after a tier of batteries 12 has been installed in the cabinet.

A vertical separation distance H between the top 34 of a battery 12 of one tier and the bottom 82 of a battery 12 of the next higher tier may be reduced to that required for the battery support structures 20. The battery support structures 20, 26 may be replaced by a tray, further reducing the spacing distance H. Vertical rails may be used in place of the longitudinal supports 26 and the tray may be used in place of the transverse supports 20. A clearance between the top of a battery 12 and the longitudinal support structure 26 for the next highest tier is shown, but may not be needed, with only a clearance between the top 34 of the battery 12 and the horizontal support members 20 being provided.

Figure 3:
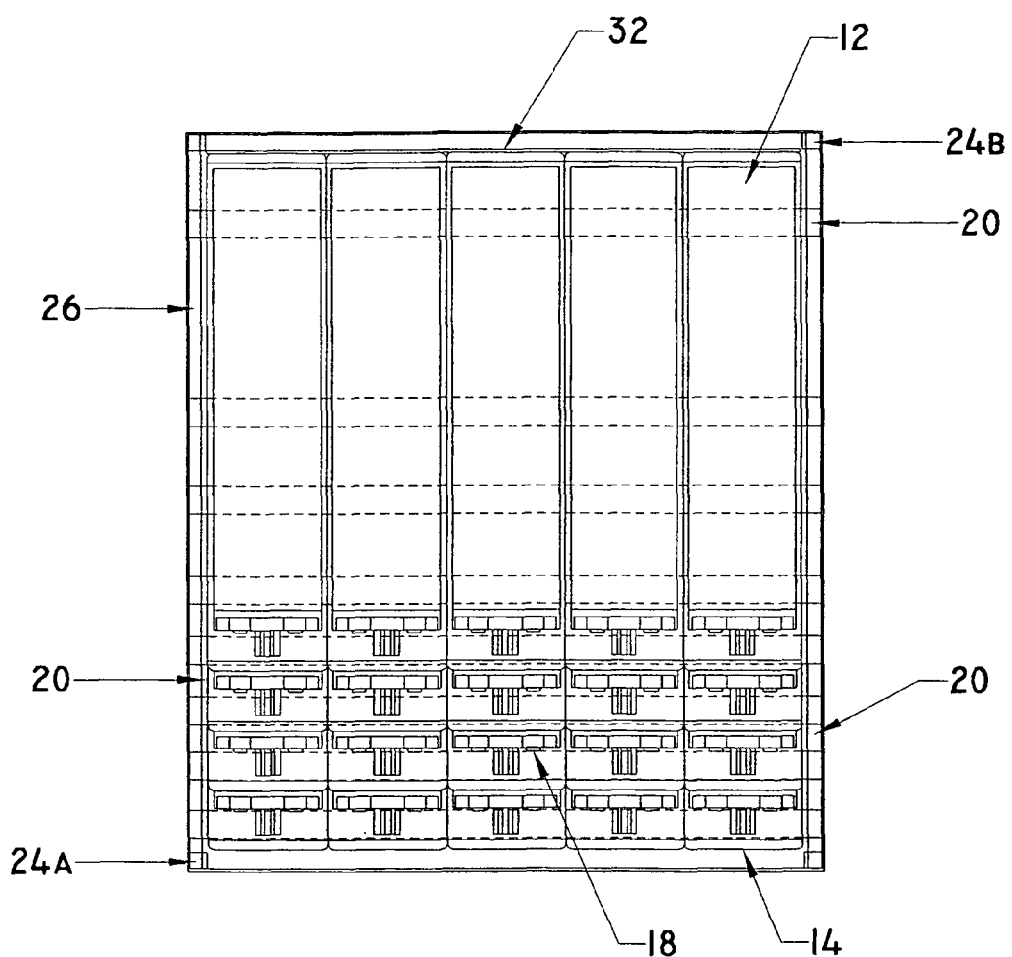
FIG. 3 illustrates a top plan view of the battery cabinet of FIG. 1.

FIG. 3 is a top view of the assembly of FIGS. 1 and 2 and shows four tiers of batteries, where each higher tier is disposed with a set back distance D. It may be seen that top mounted access terminals 18 are visible from above and can be conveniently accessed from above by tools for servicing.

Figure 4:
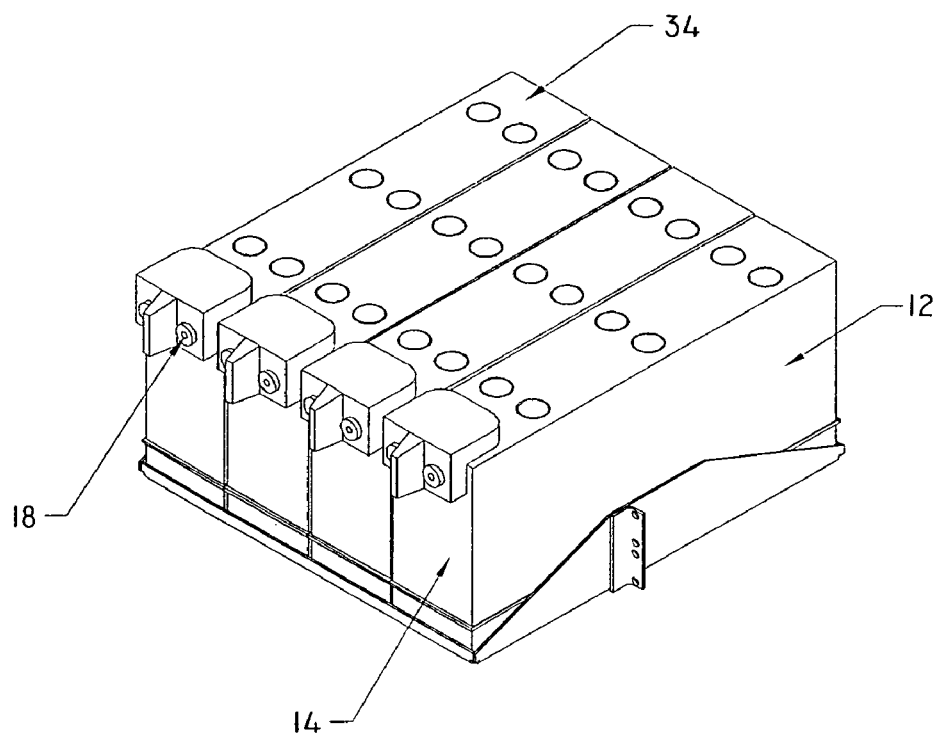
FIG. 4 illustrates a tray for supporting a tier of batteries.
Figure 4:
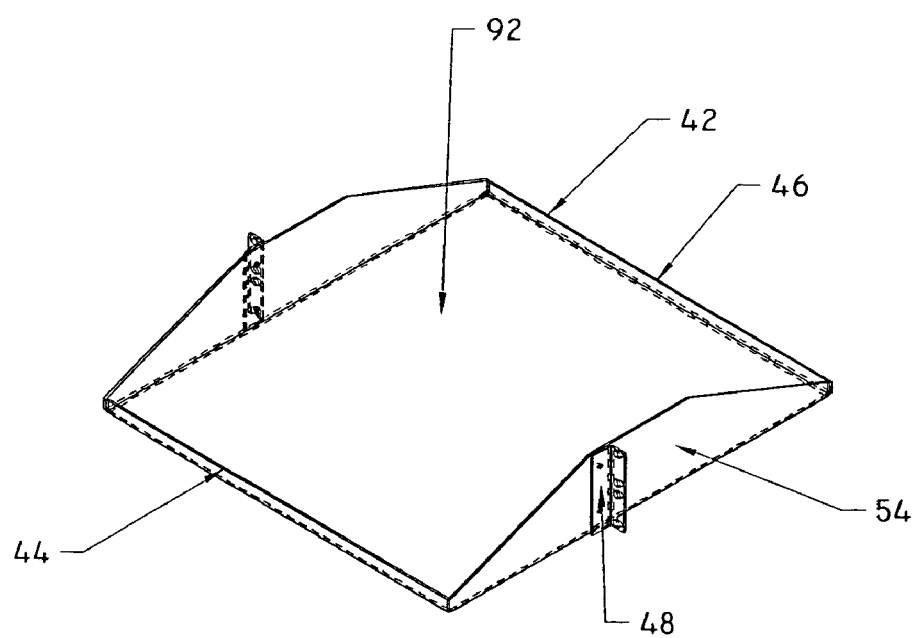

In another example, as shown in FIG. 4, each battery tier may be supported by a tray 46, the tray being fabricated so as to be capable of supporting the weight of the batteries 12 without permanent deformation or deflection. Alternatively the tray may be of a lesser strength and be supported by the same types of structures as shown in FIG. 2, or the tray may be manufactured with integral beams of the types previously described so as to form a unitary structure. The tray 46 may have either a front retaining portion 88 (see FIG. 6) or front lip 44 and either a rear retaining portion or a rear lip 42 to assist in retaining the battery 12 in the battery cabinet 10. Such retention may be a requirement in geographical areas subject to seismic effects, or to meet other safety or industry codes. The front lip structure 44 may bend downwards, or be omitted entirely, and the rear lip structure 42 may bend upwards. Such an arrangement may facilitate inserting and removing the batteries 12 through the front portion of the battery cabinet 10.

A battery 12 may be inserted into a tier through the front of the battery cabinet 10, and slid in a rearward direction until the motion is resisted by the rear lip 42, thus positioning the battery 12 in the tier. Once the batteries 12 have been installed in a tier, a front retaining plate 52 or rod may be installed. The battery retaining devices 52, 42, 44 may be fabricated from metal or a suitable high strength material such as Kevlar.

Figure 5:
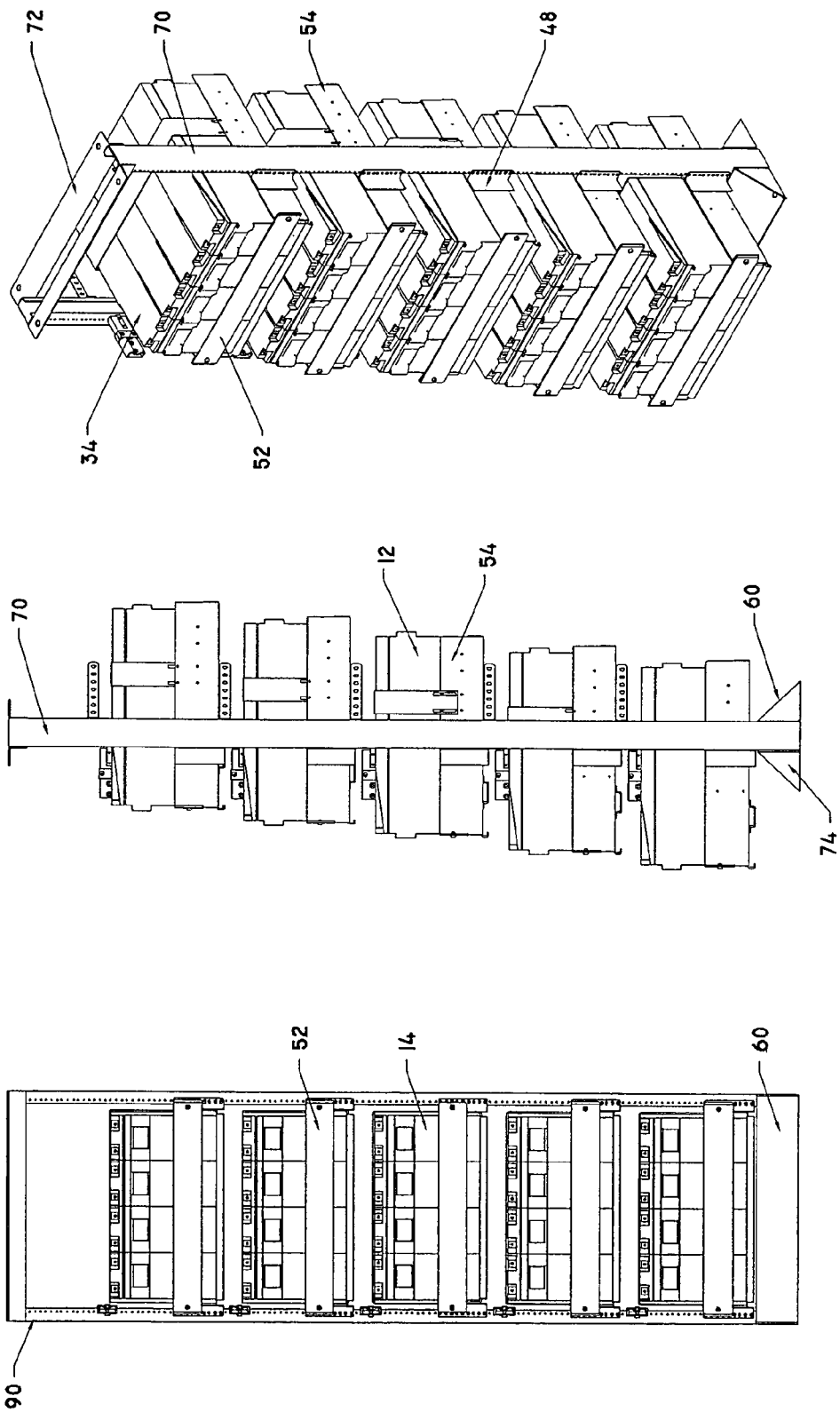
FIG. 5 illustrates a battery rack with trays and batteries installed.

In another example, the batteries may be supported by a battery rack 90. As shown in FIG. 5, the battery rack 90 includes a base 60, vertical side members 70 and, optionally, a top member 72 connecting opposing vertical side members 70. A gusset plate 74 may be fitted where the base 60 and the vertical members 70 join, so as to increase the strength and rigidity of the joint. The vertical supports 70 have mounting holes provided therein, disposed such that an attachment bracket 48 may be fastened thereto. This arrangement may also be used in a cabinet installation.

Figure 6A:
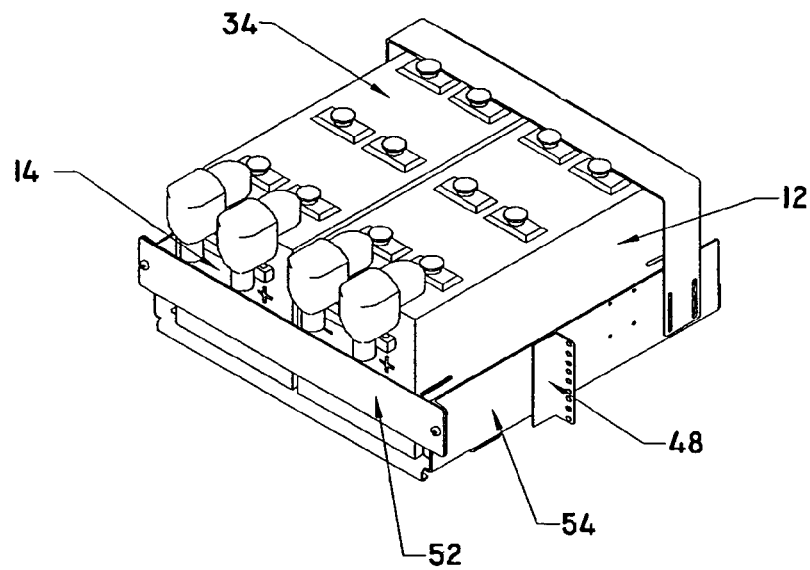
FIG. 6A illustrates another tray for supporting a tier of batteries.
Figure 6B:
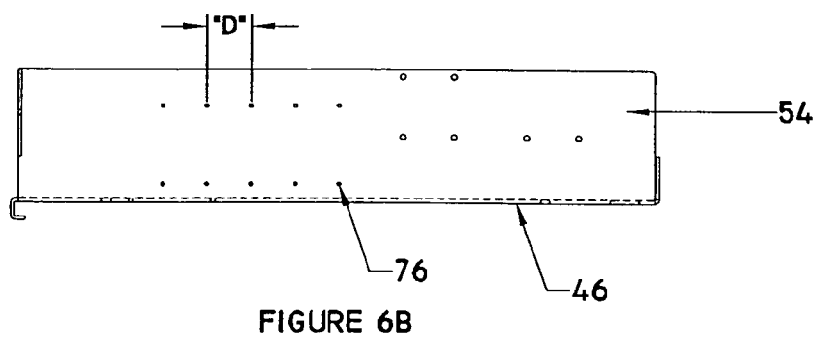
FIG. 6B illustrates a side view of the tray of FIG. 6A with a hole pattern suitable for a single vertical support on each side.
Figure 6C:
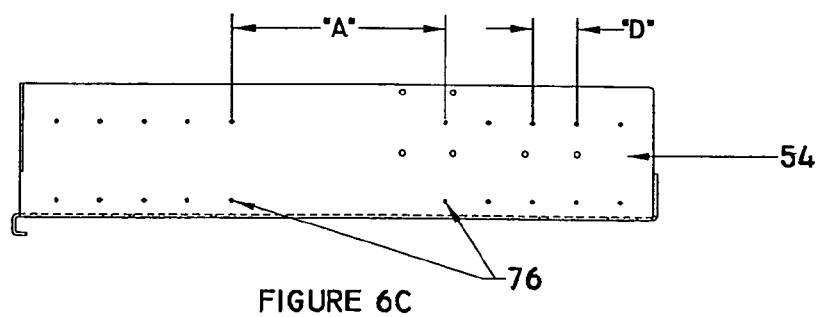
FIG. 6C illustrates a side view of the tray of FIG. 6A with a hole pattern suitable for two vertical supports on each side.

The tray structure shown in FIG. 4 may be used for accommodating batteries 12 in the rack 90. FIG. 6 shows an example of another tray structure 46 which may be suitable for use with the battery cabinet 10 or rack 90. The tray bottom surface 92 supports the batteries 12, and a front and rear lip as previously shown, or a retaining plate 52 may be provided to retain the batteries 12. Each side of the tray 46 is provided with a side surface 54, perpendicular to the bottom surface 92. The side surface 54 may be provided with a plurality of mounting holes 76 to which an attachment bracket 48 may be fastened. Groups of the plurality of holes for attaching the attachment bracket 48 to the side surface 54 may each be spaced at a distance D, corresponding to the distance increment by which successive tiers may be set back by a horizontal distance from each other. The hole pattern in the side plate shown in FIG. 6B may be suitable for connecting to a rack having a single vertical member on each side, whereas the hole pattern shown in FIG. 6C may be suitable for mounting to a rack structure which has two vertical members 70 on each side, with a distance A between centers. Where there are two vertical members on each side, the groups horizontal rows of holes may be pairs of holes, each pair of holes having a separation distance equal to A. A horizontal distance between the first of each of two pairs of holes is the spacing D.

Each battery tray 46 may be mounted to the vertical supports by attaching the battery tray attachment brackets 48 to the corresponding vertical supports 70 with screws, nuts and bolts or other fasteners, by welding or by a combination of techniques. For example, the lowest battery tray is attached to the vertical supports so that the front lip 44 of the battery tray 46 is at a front most position with respect to the base. The second battery tray is mounted to the vertical supports such that the front lip of the second battery tray is disposed a distance D further from the front of the assembly than that of the lowest battery tray. The remainder of the battery trays 46 may be mounted in a similar manner. The difference in height H between successive battery trays 46, corresponding to battery tiers, is at least the height of a battery 12.

The center of gravity of each battery tray 46, when loaded with batteries, may be forward or behind the attachment bracket 48, depending on the tier height, and the sizing and dimensioning of the tray sides 54 and the attachments 48 are suitable to resist the bending torque as well as the weight or the tray and batteries. The overall disposition of the batteries 12 may result in a center of gravity for the assembly that lies near the plane passing though the two opposing vertical members 70.

Figure 7C:
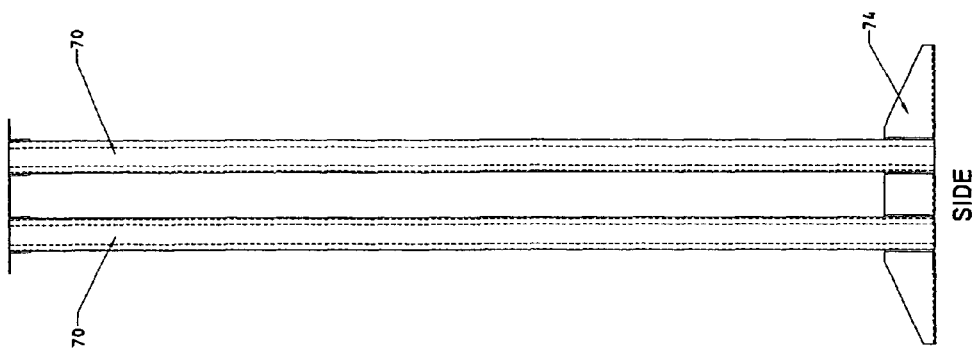
FIG. 7A illustrates a front view of a battery rack.
FIG. 7B illustrates a side view of the battery rack of FIG. 7A with one vertical support one each side thereof; and, FIG. 7C illustrates a side view of the battery rack of FIG. 7A with two vertical supports on each side thereof.
Figure 7B:
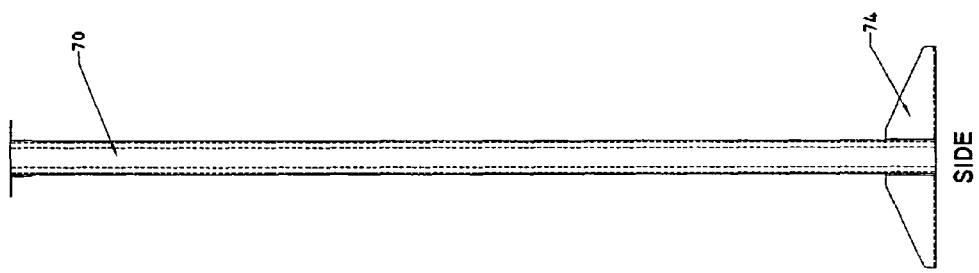
Figure 7A:
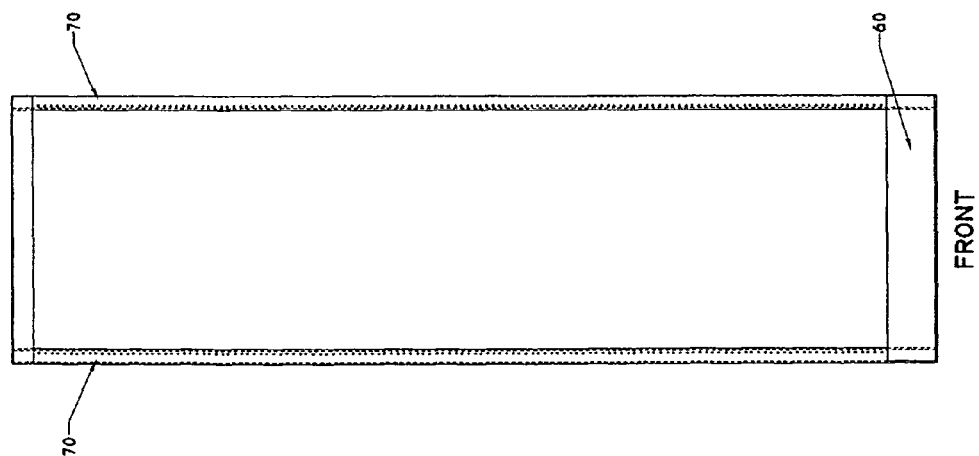

In an alternative, shown in a side elevation view in FIG. 7C, two vertical members 70 a, b may be provided on each side of the rack assembly 90. The spacing between the two vertical members 70 a, b may be a distance A, where mounting holes on the battery tray are correspondingly spaced as shown in FIG. 6C, or other similar arrangement, so that the battery tray 42 may be attached to the two vertical members 70 a, b on each side of the rack 90 by attachment brackets 48 mountable to the holes on the sides 54 of the battery tray 42. Such an arrangement may reduce the bending torque on the attachment brackets 48 between the battery tray 42 and the vertical supports 70 a, b.

A first plurality of tiers for receiving batteries are stepped back from the front with respect to a lower tier as the tier rank increases when measured from the base of the cabinet. A second plurality of tiers may be configured, where the lower of the tiers of the second plurality of tiers is not referenced to a tier in the first plurality of tiers.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A battery mounting apparatus, comprising:
   a vertical support, the vertical support disposed orthogonal to a base and fixedly attached thereto; and
   a first and a second horizontal support, each horizontal support configured to be attachable to the vertical support;
   wherein a front part of the first horizontal support is spaced a horizontal distance from the front part of the second horizontal support, and the second horizontal support is spaced a vertical distance from the first horizontal support.

2. The apparatus according to claim 1, wherein the horizontal distance between the front parts of the first and second horizontal supports is sufficient to provide top access to a battery with a top mounted connection terminal.

3. The apparatus according to claim 1, wherein the vertical distance is at least equal to the height of a battery.

4. The apparatus according to claim 1, wherein the base has a length in the direction of the horizontal distance such that a vertical projection of a center of gravity of the apparatus with any number of batteries installed is contained with a base perimeter.

5. The apparatus according to claim 4, wherein the base perimeter has a rectangular shape with a first dimension in the direction of the horizontal distance, and a second direction orthogonal to the horizontal distance both distances being in a horizontal plane, and the base perimeter circumscribes at least three sides of the base.

6. The apparatus of claim 1, wherein the each of the first and the second horizontal supports is a tray, the tray comprising:
   a horizontal plate;
   a vertical plate attached to an edge of the horizontal plate; and
   a plurality of holes disposed in the vertical plate.

7. A battery mounting apparatus, comprising:
   a base;
   vertical beams orthogonal to a plane of the base;
   first horizontal beams connecting the vertical beams at sides of the base, the first horizontal beams being spaced in a vertical direction; and
   second horizontal beams joining opposing first horizontal beams, to form a horizontal plane containing the second horizontal beams,
   wherein a front-most beam of the second horizontal beams in each plane is disposed such that a front or a top of a battery disposed on the plane may be accessed from the top.

8. The apparatus according to claim 7, wherein a vertical distance between adjacent planes is at least equal to the height of a battery.

9. The apparatus according to claim 7, wherein an unfilled volume having a vertical distance at least equal to the vertical distance between planes is disposed over a top front of the battery.

10. A battery mounting apparatus, comprising:
    a base;

vertical supports at two opposing sides of the base, the vertical supports being orthogonal to the base;
a plurality of horizontally disposed trays configured to be attached to the vertical supports; and
a front edge of each tray disposed such that the front edge is further from a front of the base as the tray is a greater vertical distance from the base.

11. The apparatus according to claim 10, wherein a horizontal distance between front edges is dimensioned so as to provide top access to at least one of front or top mounted battery terminals.

12. The apparatus according to claim 11, wherein the vertical distance between adjacent trays is at least equal to the height of a battery.

13. The apparatus according to claim 10, wherein the base is comprised of:
two side members disposed parallel to each other at a distance corresponding to a width; and
a cross member joining approximate mid-points of the side members.

14. The apparatus according to claim 10, wherein the base is comprised of:
side members disposed parallel to each other at a distance corresponding to a width; and
cross members joining corresponding ends of the side members.

15. The apparatus of claim 10, wherein the tray has an upward directed lip at at least one of the front or rear end thereof.

16. The apparatus of claim 10, wherein the tray has a removable retaining structure at the front thereof.

17. A battery mounting apparatus for mounting on a substantially horizontal surface, comprising:
a first and a second pair of substantially parallel vertical uprights, the vertical uprights being perpendicular to the substantially horizontal surface, each of said uprights having a top end and a bottom end;
a base secured to the uprights adjacent to the bottom end of each of the uprights;
a plurality of longitudinal horizontal support beams connecting each beam of the first and the second pair of uprights and being disposed in a parallel orientation, a plurality of the horizontal support beams being spaced a first vertical distance; and
transverse horizontal support beams connecting each pair of parallel longitudinal support beams, the horizontal spacing between the transverse horizontal support beams being dimensioned so as to provide support for a battery,
wherein a front-most of the transverse horizontal support beams connected to the pair of longitudinal support beams is spaced a distance in the longitudinal direction from an adjacent front-most transverse horizontal support beam.

18. The apparatus of claim 17, where the longitudinal spacing distance is dimensioned so that a battery connection terminal mounted on a top surface the battery may be accessed from a vertical direction.

19. A battery mounting apparatus for mounting on a substantially horizontal floorlike surface, comprising:
a pair of substantially parallel vertical uprights, each of said uprights having a top end and a bottom end;
a base secured to the uprights adjacent to the bottom end of each of the uprights and holding the uprights in a vertical attitude with respect to the floorlike surface;
a first and a second tray adapted to be connected between the vertical uprights,
wherein a front edge of the second tray is a horizontal distance from a front edge of the first tray, and the second tray is spaced a vertical distance above the first tray.

20. An apparatus for housing storage batteries, comprising:
a pair of vertical supports mounted orthogonally to a horizontal support surface;
first means for supporting a first storage battery, attachable to the pair of vertical supports; and
second means for supporting a second storage battery, attachable to the pair of vertical supports, the second means being disposed above the first means;
wherein the second means is displaced horizontally with respect to the first means so that a front surface of the first battery is closer to a front of a relay rack or cabinet than a front surface of the second battery is to the front of the relay rack or cabinet.

21. A battery support tray, comprising:
a horizontal plate of substantially rectangular shape;
a pair of plates disposed orthogonally to the horizontal plate and attached to the horizontal plate at opposing edges of the horizontal plate;
a vertically oriented plate attached to each of the pair of plates, the vertically oriented plates having a plurality of holes formed therein, the holes being spaced at a vertical distance so as to conform to holes in a support structure, and the holes being spaced at a horizontal distance such that at least a pair of holes is alignable with a corresponding pair of holes in a plate of the pair of plates.

22. The battery support tray of claim 21, wherein the horizontal distance is an integral increment of a predetermined set back distance.

23. The battery support tray of claim 21, wherein each of the plurality of holes is a pair of holes, the spacing between each of the pair of holes being spaced to conform to a spacing of mounting holes in the support structure.

24. The battery support tray of claim 21, wherein at least one of a front edge or a rear edge of the horizontal plate has a lip extending orthogonal to the horizontal plate.

25. The battery support tray of claim 21, further comprising a retaining plate, removably mountable to a front end of the battery support tray and oriented so as to retain a battery resting on the horizontal plate.

26. The apparatus according to claim 1, wherein the horizontal distance between the front parts of the first and second horizontal supports is sufficient to provide top access to battery with a front mounted connection terminal.

27. The apparatus of claim 1, wherein the each of the first and the second horizontal supports is a tray, the tray comprising:
a horizontal plate having a vertical lip formed in opposing ends of the plate
a plurality of holes disposed in the lip, spaced horizontally such that a pair of holes in the lip have a same spacing distance as a pair of holes in the vertical support.

28. The apparatus of claim 1, wherein the horizontal supports are attached by bolting.

29. The apparatus of claim 1, wherein the horizontal supports are attached by welding.

30. The apparatus of claim 6, wherein the plurality of holes are spaced vertically such that at least a pair of holes conforms to holes in the vertical support.

31. The apparatus of claim 6, wherein the plurality of holes are spaced horizontally such that at least a pair of holes conforms to holes in the vertical support.

32. A battery mounting apparatus, comprising:
a base;

vertical beams affixed to the base so as to be oriented orthogonal to a plane of the base;

first horizontal beams connecting the vertical beams at each side of the base, the horizontal beams being spaced in a vertical direction and forming opposed pairs; and at least two groups of second horizontal beams, a first group of second horizontal beams spaced apart in a horizontal direction, and a second group of second horizontal beams spaced apart in a horizontal direction, each of the first and the second groups of second horizontal beams connecting opposing first horizontal beams, wherein a front-most beam of a first group of second horizontal beams and a front-most beam of a second group of second horizontal beams is disposed such that a portion of a top surface of a battery disposed on top of the first group of second horizontal beams may be accessed from a top direction.

33. The apparatus of claim 17, where the longitudinal spacing distance is dimensioned so that a battery connection terminal mounted on a front surface the battery may be accessed from a vertical direction.

34. The apparatus of claim 19, wherein the tray is connected by welding.

35. The apparatus of claim 19, wherein the tray is connected by bolting.

36. A battery mounting apparatus, comprising:
a vertical support, the vertical support disposed orthogonal to a base and fixedly attached thereto; and
a first and a second horizontal support, each horizontal support configured to be attachable to the vertical support, wherein each of the first and the second horizontal supports is a tray, the tray comprising:
a horizontal plate;
a vertical plate attached to an edge of the horizontal plate; and
a plurality of holes disposed in the vertical plate; and
wherein a front part of the first horizontal support is spaced a horizontal distance from the front part of the second horizontal support, and the second horizontal support is spaced a vertical distance from the first horizontal support.

* * * * *